United States Patent
Wolf et al.

[11] Patent Number: 5,167,934
[45] Date of Patent: Dec. 1, 1992

[54] CATALYZER INSTALLATION FOR BOAT ENGINES AND METHOD FOR CATALYTIC EXHAUST GAS CLEANING

[75] Inventors: Rainer Wolf, Bad Durkheim; Juergen Volz, Friedelsheim; Peter Burghardt, Maxdorf; Roland Sand, Neupolz, all of Fed. Rep. of Germany

[73] Assignee: KST-Motorenversuch GmbH & Co., KG, Bad Durkheim, Fed. Rep. of Germany

[21] Appl. No.: 372,361

[22] PCT Filed: Oct. 27, 1988

[86] PCT No.: PCT/DE88/00665
§ 371 Date: Jun. 16, 1989
§ 102(e) Date: Jun. 16, 1989

[87] PCT Pub. No.: WO89/03928
PCT Pub. Date: May 5, 1989

[30] Foreign Application Priority Data
Oct. 28, 1987 [DE] Fed. Rep. of Germany ....... 3736500

[51] Int. Cl.$^5$ ............................................. B01D 50/00
[52] U.S. Cl. .................................. 422/177; 422/179; 422/180; 422/172; 60/274
[58] Field of Search ............... 422/172, 173, 177, 180, 422/169, 179; 60/274

[56] References Cited

U.S. PATENT DOCUMENTS

| | | | |
|---|---|---|---|
| 1,858,637 | 5/1932 | McDonald | 422/177 |
| 3,736,105 | 5/1973 | Tourtellotte et al. | 422/172 |
| 3,892,537 | 7/1975 | Gulati et al. | 422/179 |
| 3,966,419 | 6/1976 | Bloomfield | 422/179 |
| 3,972,687 | 8/1976 | Frietzsche | 23/288 FC |
| 4,004,887 | 1/1977 | Stormont | 422/179 |
| 4,161,509 | 7/1979 | Nowak | 422/179 |
| 4,188,783 | 2/1980 | Sayo et al. | 422/179 |
| 4,190,629 | 2/1980 | Strachan | 422/169 |
| 4,238,456 | 12/1980 | Jabling | 422/172 |
| 4,278,639 | 7/1981 | Takadoro et al. | 422/172 |
| 4,338,284 | 7/1982 | Ignoffo | 422/171 |
| 4,432,207 | 2/1984 | Davis, Jr. et al. | 422/179 |
| 4,448,754 | 5/1984 | Isogai et al. | 422/179 |
| 4,511,536 | 4/1985 | Shimozi et al. | 422/172 |
| 4,622,809 | 11/1986 | Abthoff et al. | 60/274 |
| 4,678,643 | 7/1987 | Fetzer | 422/175 |
| 4,755,518 | 10/1988 | Abthoff et al. | 422/180 |
| 4,830,833 | 5/1989 | Shaff | 422/181 |
| 4,833,725 | 7/1977 | Reed et al. | 422/172 |

FOREIGN PATENT DOCUMENTS

| | | |
|---|---|---|
| 438040 | 8/1973 | Australia . |
| 0128653 | 12/1984 | European Pat. Off. . |
| 2401287 | 7/1974 | Fed. Rep. of Germany . |
| 3439891 | 4/1986 | Fed. Rep. of Germany . |
| 2454517 | 11/1980 | France . |
| 60-36709 | 2/1985 | Japan . |

OTHER PUBLICATIONS

Patent Abstracts of Japan, vol. 9, No. 162 (M-394) Jul. 6, 1985.

Primary Examiner—Robert J. Hill, Jr.
Assistant Examiner—Abanti B. Singla
Attorney, Agent, or Firm—Foley & Lardner

[57] ABSTRACT

The invention relates to a catalyzer installation for spark-ignition engines which are operated with air/fuel ratios of $\lambda 1$, particularly for boat engines, the catalyzer being subdivided into a reduction part located upstream in the exhaust gas line and an oxidation part located coaxially downstream after it. An intermediate space is located between the reduction and oxidation parts. Both catalyzer parts are surrounded by a preferably cylindrical, water-cooled casing and the casing has a downstream secondary air inlet to which a secondary air blower can be connected, the secondary air separating the very hot catalyzer from the double-walled, water-cooled casing and, in particular, flowing round the oxidation catalyzer part in counterflow for air preheating so that the air preheated in this manner is passed through the intermediate space into the oxidation part. The catalyzer is accommodated in a cartridge which is supported in wire compression rings in the catalyzer casing.

15 Claims, 6 Drawing Sheets

CATALYZER INSTALLATION FOR BOAT ENGINES AND METHOD FOR CATALYTIC EXHAUST GAS CLEANING

BACKGROUND OF THE INVENTION

The present invention relates to a catalyzer installation for spark-ignition engines which are, in particular, run "rich", i.e. sub-stoichiometric at an air/fuel ratio less than 1.

The use of the known 3-way catalyzers is conditional on the presence of an injection system, or electrically controlled carburetor, because only these permit operation of the spark-ignition engine in the so-called "lambda window", i.e. at between $\lambda=0.98$ and $\lambda=1.02$ for the required high levels of pollutant reduction. Uncontrolled catalyzers require that the mixture be kept between $\lambda=0.95$ and $\lambda=1.03$ over the whole of the operating characteristics; they only, however, provide pollutant reductions of, on average, 50%.

SUMMARY OF THE INVENTION

The object of the present invention, on the other hand, is to find a catalyzer installation for spark-ignition engines by means of which exhaust gases from boat engines can be treated even when they run rich, i.e. with high CO and HC emissions (e.g. CO emissions of more than 6%).

The present invention is therefore intended to be particularly suitable for use on boat engines which are sometimes run with very low lambda values of between about 0.75 and 0.90.

This object is achieved by means of a catalyzer installation, for reducing the pollutant emissions (hydrocarbons, carbon monoxide and oxides of nitrogen) from boat engines, with a reduction part located upstream in the exhaust gas line and an oxidation catalyzer part located downstream line with purely axial passage of the exhaust gas through the catalyzer parts, the catalyzer installation having the following combination of features:

a) the catalyzer is surrounded by a water-cooled casing
b) an air gap is left between the catalyzer surface and the water-cooled casing
c) a secondary air injection system is located downstream in the exhaust gas line
d) the secondary air is passed over the oxidation catalyzer part through the gap into an intermediate space between the reduction catalyzer part and the oxidation catalyzer part.

The present invention can be used with particular advantage in the case of boat engines, for which the detoxification of the exhaust gases by catalytic treatment of the exhaust gas is not yet known.

The fuel consumption of engines plays only a subordinate role in the case of sports boats with spark-ignition engines, which may be attributed to their use as leisure equipment—with short utilisation periods relative to motor vehicles—and to the favorable ratio between the transport performance and the operating power of ships. For this reason and because of the relatively low manufacturing costs, "marinized" V-8 motor vehicle spark-ignition engines, with low specific loading (HP/kg), are often used in sports boats. Boats for longer ranges are generally equipped with more economical diesel engines.

In principle, boat engines are only run at idle and, when under load, along the propeller characteristic line at a high proportion of full load. Overrun, continuous variation in rotational speed and load, gear changing operations and stop/go operation, such as occur in motor vehicles, hardly occur at all in boat operation.

For reasons of running quality and internal cooling, these engines are run with a marked shortage of air and therefore, as already mentioned, high CO and HC emissions but, on the other hand, relatively low proportions of NOx.

The solution according to the invention leads to a pollutant reduction of over 90% in all the three pollutant components mentioned.

It is proposed that the ceramic catalyzers conventionally used in the motor vehicle industry up to now should be replaced by metallic carriers, in particular in metal cartridges; in addition to insensitivity to shock and high temperature compatibility, these metallic carriers introduce design advantages such as smaller dimensions.

In particular, it is proposed that the cartridges should be supported in the catalyzer casing so that they can be easily replaced; they can then be rapidly removed or exchanged in the case of damage, poisoning or non-availability of lead-free fuel. For this reason, the catalyzer parts are, according to the invention, accommodated in a metal sleeve (cartridge) in which air inlet holes are located between the reduction part and the oxidation part.

Easy assembly and replacement capability are achieved according to the invention by releasably connecting the catalyzer casing to an elbow (also water-cooled) which is in turn supported on the water-cooled exhaust gas manifold. In this way, the catalyzer casing can be easily separated from the elbow and the cartridge can be extracted. In this arrangement, the elbow has a bend of at least 90°.

A very important aspect of the present invention concerns the supporting of the cartridge in the catalyzer casing. Because the surface temperature of the catalyzer can reach 900° C. or more and because, on the other hand, the air gap between the cartridge and the inner surface of the casing must be made of small dimensions and also because strong vibration loads (30 g and above) occur at the same time, there is an additional object to provide stable support despite these requirements and to make it possible to use light metal, such as aluminum, for the catalyzer casing. This object is achieved according to the invention by the catalyzer casing having front and rear recesses on its inner wall, by providing the front, reduction catalyzer part with a ring which is preferably of trapezoidal cross-section. Wire compression rings are in contact on both sides with the ring and the catalyzer casing, forming a fixed support and being clamped by means of the elbow. The object is further achieved by surrounding the rear, oxidation catalyzer part at its end by a wire compression ring which is supported against the recesses. It is at the same time in contact with the cartridge and is held radially by an exhaust connection connected releasably to the catalyzer casing and forming a movable support. The wire compression rings, in this context, are understood to comprise woven wires formed into rings. Such wire compression rings are commercially available.

The wire compression rings prevent, on the one hand, high heat transfer but, on the other hand, also damp the transmission of vibration to the cartridge. In addition, the wire compression rings can be used, in the manner given, to provide a fixed and a movable support—while retaining easy assembly and dismantling—because these rings are in elastically deforming contact against the recess or the trapezoidal ring and the cartridge when compressed by the elbow and the exhaust connection.

It is also proposed that the wire compression rings should be inserted in deformable wheel rim-type metal rings. By this means, gas closure relative to the adjacent chambers is achieved in a simple manner, the seal at the reduction end being produced by contact between the metal ring flanks on the end surfaces of the recess and the elbow and on the trapezium surfaces of the support ring and, at the oxidation end, by the ring being placed on the cartridge and being in contact with both the recess and the end surface of the exhaust connection. For this purpose, the compression rings and the support rings preferably have flanks which widen towards the outside. By appropriate dimensioning, a subdivision into a fixed support and a sliding support is achieved in this way in order to permit changes in the length of the cartridge.

It has been found by tests that the annular gap around the catalyzer and the distance apart of the two catalyzer parts should be in a certain numerical ratio to each other in order to optimize the catalyzer. It has been found particularly favorable to adjust the annular gap to approximately 1-10 mm wide and the distance apart to less than 20 mm.

In a similar manner to the exhaust gas detoxication installations in motor vehicles, it is also necessary to inspect the effectiveness of the boat installations regularly. Because the main operating range of boat engines is specified by the propeller curves, the inspection can be carried out in a substantially simpler manner than in the case of a motor vehicle by measuring the relevant exhaust gas components after the catalyzer at defined load points along the propeller characteristic line.

For this purpose, it is proposed that an exhaust gas sampling station should be provided at the outlet of the exhaust gas from the catalyzer cartridge but before the addition of the cooling water to the exhaust gas.

The measurement of the exhaust gas at this station takes place by means of portable measuring units, which have become available in the meantime, for hydrocarbons, carbon monoxide and oxides of nitrogen. In order to permit measurement under load, the measurement unit is carried in the boat when it is underway or the boat is connected by lines to an appropriately stable jetty. The load condition of the engine is checked by measuring the rotational speed of the specified propeller.

The still permissible measurement values for such a short inspection must be determined during the type of testing of the individual boat propulsion systems. They should be recorded as limiting values in the boat documents or in the engine documents so that they will be available when retesting occurs.

Where this inspection is supplemented by measurements of the exhaust gas before the catalyzer, information on the way in which the mixture preparation, ignition system and, in particular, the engine exhaust gas detoxication installation are functioning incorrectly can be provided to the owner of the boat in cases where the exhaust gas figures are excessive; this facilitates appropriate repairs.

In order to empty any condensate water from inside the catalyzer and to avoid the entry of cooling water, the catalyzer is preferably mounted on the manifold so that it is inclined downstream, i.e. the elbow has a bend which is appropriately larger than 90°.

The exhaust gas temperature in the elbow is about 700° C. in order to reduce the constructional size of the catalyzer or to increase the rate of conversion. It is also proposed that extra secondary air should be blown into the elbow in order to equalize the heat distribution. This makes it possible to reduce the CO and HC proportions by about 50%. The air is preferably blown into the elbow in counterflow. The additional secondary air can, however, also be blown in via a second secondary air inlet, e.g. in crossflow.

The high effectiveness of the device according to the invention, particularly in the case of low engine load and after starting procedures, may be attributed, on the one hand, to the heat given up by the counterflow passage of the secondary air and its preheating by the outer surface of the catalyzer and to the annular passage of this secondary air over the inlet surface of the oxidation catalyzer. At high engine and catalyzer loads, the continually renewed air covering also serves essentially to insulate the very hot catalyzer from the cold, water-cooled casing parts.

Because the catalyzer temperatures are so high that there would be danger of fire if the exhaust gas should emerge into the boat space, the secondary air inlets shall be provided with non-return valves at fixed locations on the catalyzer casing so that no gas can escape from the casing—after damage to the secondary air supply pipes, for example.

The following test has been carried out using the catalyzer according to the invention:

An approximately 7 m long boat with a total weight of approximately 2000 kg was used as the research vehicle. This boat was propelled by a V-8 carburetor engine of 226 kW with a propeller of 15×19 inches.

The catalyzer installations according to the invention were installed on the manifold with separate air pumps. Exhaust gas sampling stations were located before and after the catalyzers. The pressure and temperature were monitored.

RESULTS

There was no decrease in boat performance; the outer surface of the whole of the casing remained only hand-warm even at full load.

The lambda values varied between 0.77 and 0.82 over the whole of the range of rotational speed and the exhaust gas temperatures before the catalyzer were correspondingly low at a maximum of 680° C.

Using the secondary air pumps, the lambda values in front of the oxidation catalyzer were adjusted to between $\lambda = 1.08$ and 1.14, this being associated with an increase in exhaust gas temperature up to as much as 1000° C.

The CO proportions before the catalyzer were between 7 and 9%, the maximum HC emission was 500 ppm and the maximum NOx value was 340 ppm. The figures measured after the catalyzer were 0.5% CO, 50 ppm HC and 130 ppm NOx.

The tests are illustrated in FIGS. 5 and 6 and the pollutant conversion rates can also be calculated from FIG. 2 (90% on average). As shown in FIG. 5, all three pollutant components in the engine exhaust gas are clearly reduced using the KST catalyzer installation for V-8 boat engines. Hydrocarbons (HC), carbon monoxide (CO) and oxides of nitrogen ($NO_x$) are all greatly reduced over the whole rotational speed and load range. As shown in FIG. 6, the conversion rates for the three pollutant components, hydrocarbon (HC), carbon monoxide (CO) and oxides of nitrogen ($NO_x$), obtained using the KST catalyzer installation for 4-stroke boat spark-ignition engines, are between 50% and more than 95%. On average, degrees of effectiveness of 80% are achieved with various types of engines.

BRIEF DESCRIPTION OF THE DRAWINGS

The device according to the invention for a boat engine is explained, as an example, using the attached figures.

FIG. 4 shows flanks of the support rings.

DETAILED DESCRIPTION OF THE PREFERRED EMBODIMENTS

Figure 1:
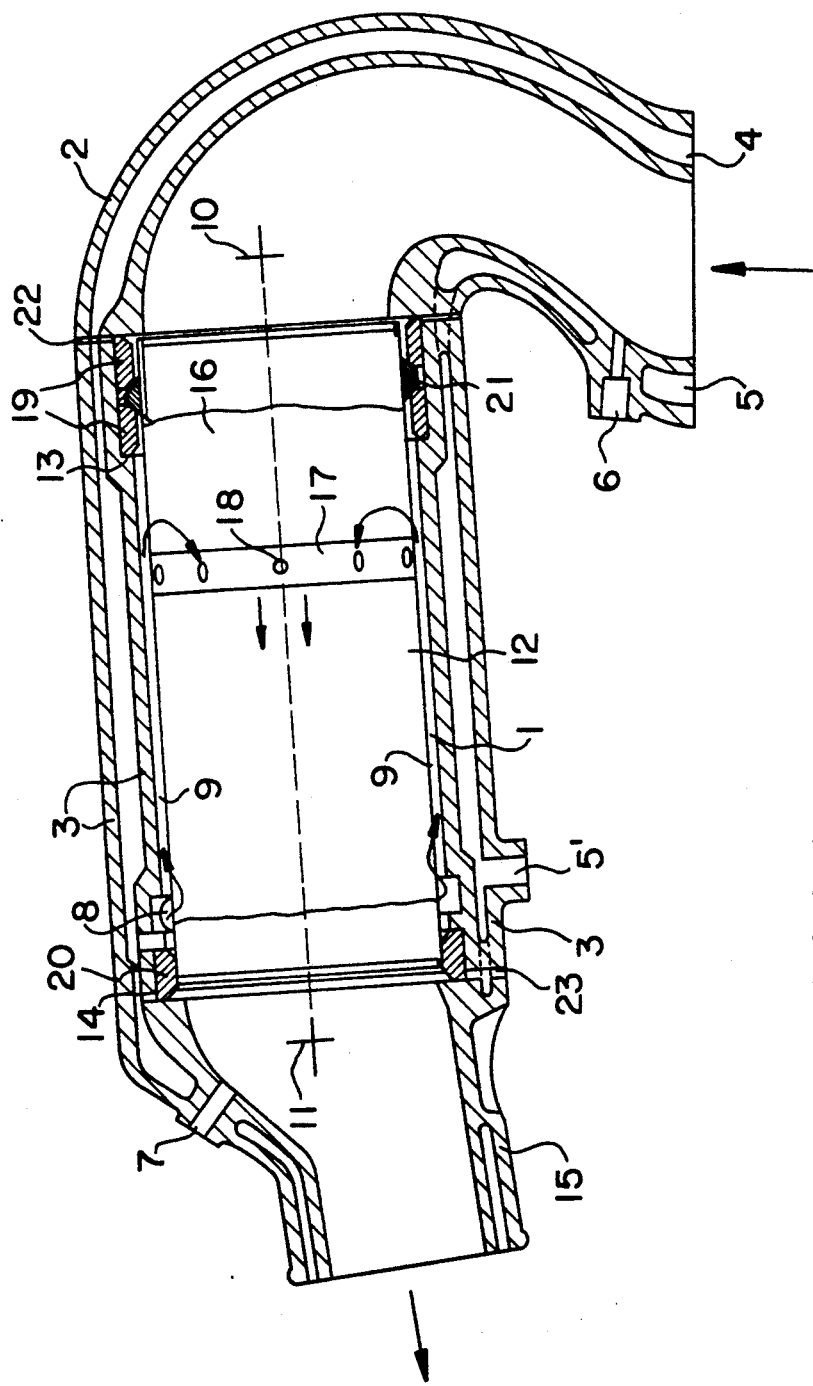
FIG. 1 shows a section through the catalyzer installation

On a water-cooled double-walled exhaust gas manifold (one located on each side in the case of V-engines), there is an elbow 2 which is releasably connected to the manifold and to the subsequent catalyzer casing 3, both being also designed t be double-walled and water-cooled. The elbow has a bend of more than 90°, by which means, on the one hand, the catalyzer casing is located at an inclination for condensate water emptying and, on the other hand, the metal catalyzer cartridge 1, with the reduction part 16 and the oxidation part 12, is supported so that it can be easily removed in order, for example, to permit cartridge exchange or even, in case of necessity, operation on leaded petrol.

The metal catalyzer cartridge 1 connects the two catalyzer parts 12 and 16 while leaving free an intermediate space 9 used as the secondary air inlet.

The cartridge 1 is supported in the catalyzer casing 3 by means of wire compression rings 19, 20 and a trapezoidal ring 21; the wire compression rings are located in recesses 13 and 14.

A secondary air inlet 8 connected to a secondary air blower (not shown) is located in the catalyzer casing 3 in the exhaust gas downstream direction; ambient air reaches the air preheating annular gap 9 via this secondary air inlet 8 and is heated by the surface of the oxidation catalyzer part 12. In particular, the secondary air can also be blown in with a tangential component in order to achieve even flow around the catalyzer cartridge because substantial quantities of heat are withdrawn from the surface of the cartridge. The secondary air flow, on the one hand, substantially improves the cooling of the catalyzer casing 3, which is of particular service to safety in boat operation, and, on the other hand, permits rapid achievement of the operating temperature (starting behavior).

Around the intermediate space 17 between the oxidation and reduction catalyzer parts, the cartridge 1 has openings 18 which, as shown, can be holes—but also slots or the like—whose dimensions have to be adapted to the pressure loss which can be tolerated and the secondary air quantity necessary for the particular engine.

The cooling water connection is indicated by 4 and the cooling water drain by 5; these are advantageously located in the exhaust gas manifold, which is not shown. Gas sampling probes 6 and 7 are provided for inspection purposes in the elbow 2 and at the outlet end on the exhaust connection 15. Lambda probes 10 and 11 and-/or additional secondary air inlets can also be accommodated here. A further cooling water drain is indicated by 5'.

Figure 3:
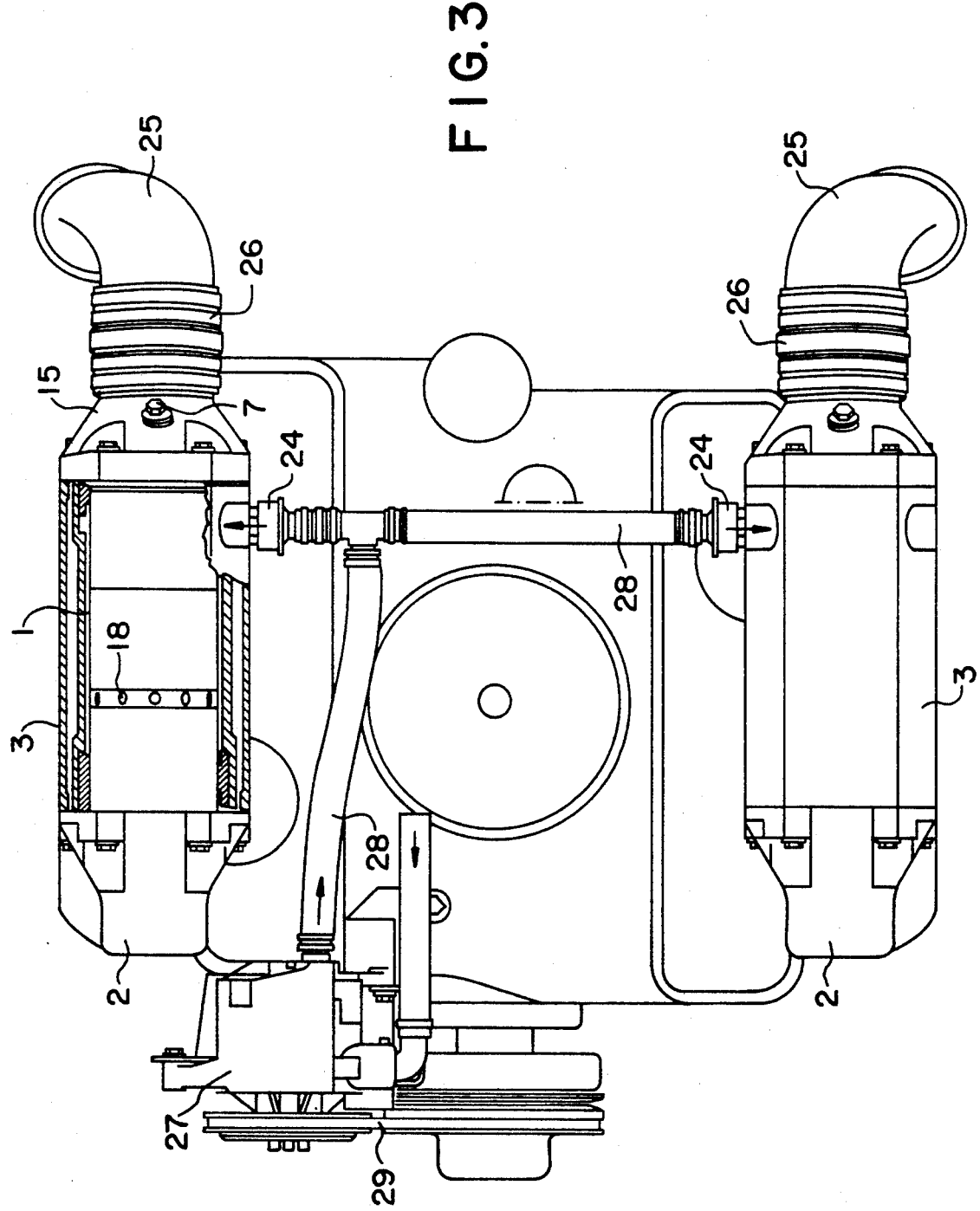
FIG. 3 shows a boat engine.
Figure 4:
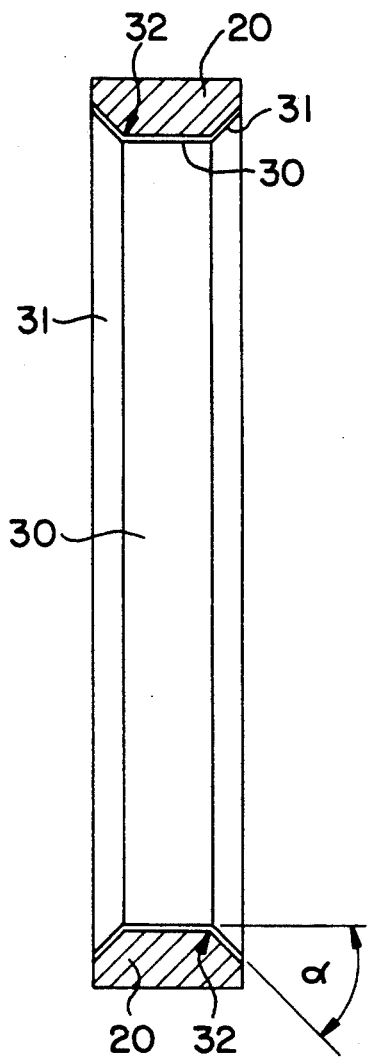
FIG. 4 shows the supporting structure of a portion of the catalyzer of FIG. 1.
Figure 5:
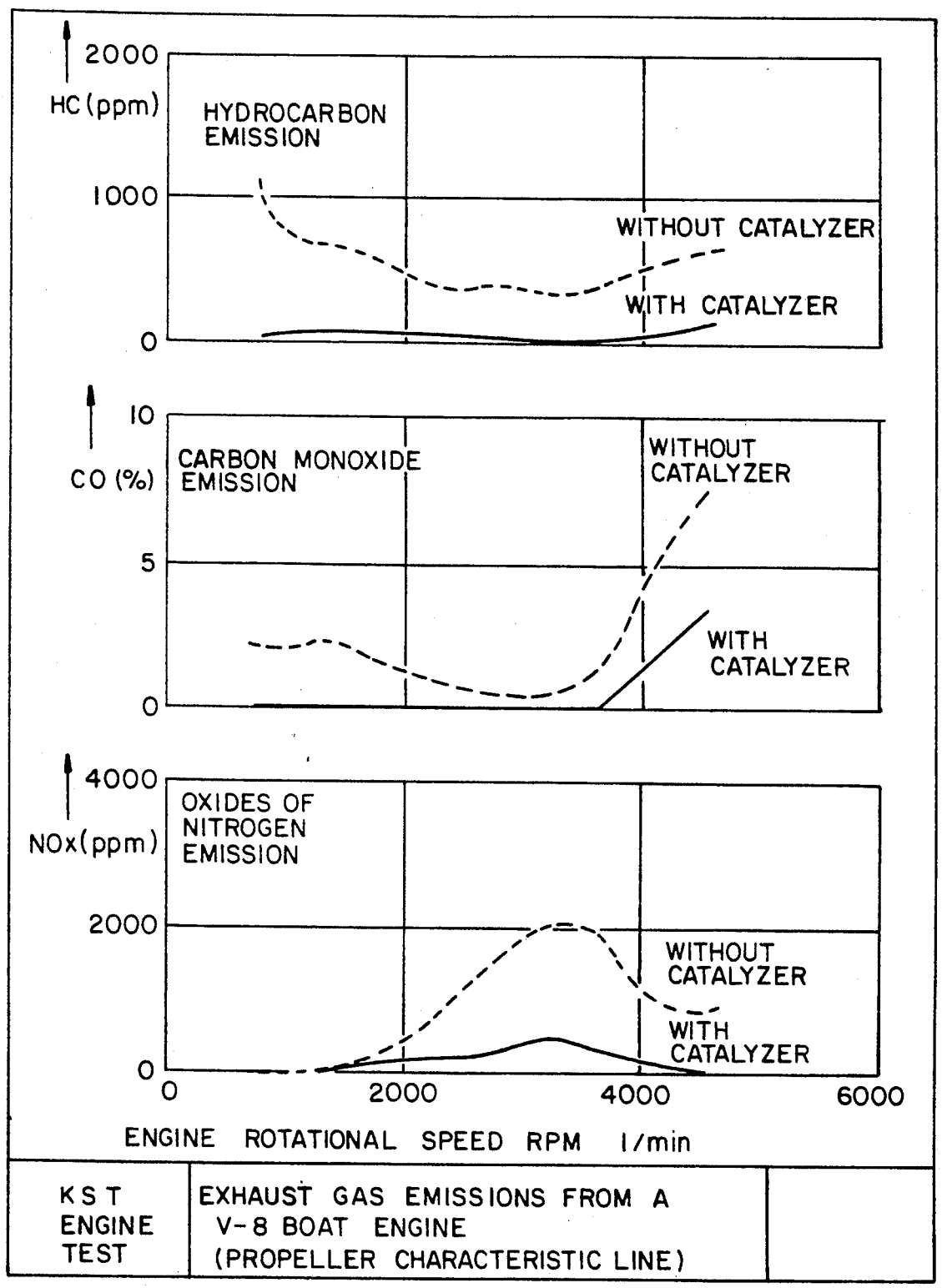
FIG. 5 shows exhaust gas detoxication of spark-ignition engines for boat operation.
Figure 6:
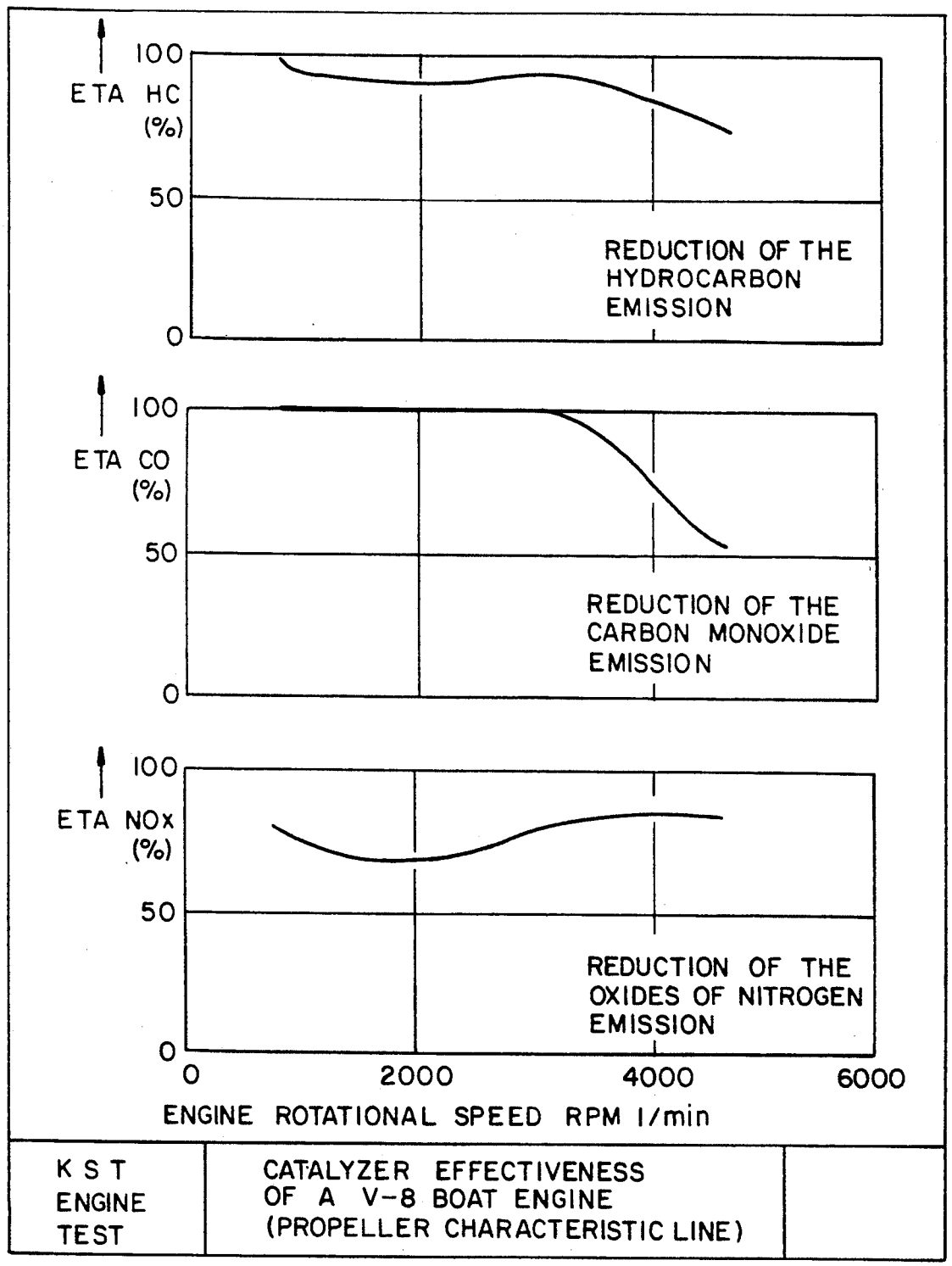
FIG. 6 shows exhaust gas detoxication of spark-ignition engines in boat operation.

Because of the special safety regulations for boat operation, non-return valves shown at all the secondary air inlets are provided (FIG. 3).

The exhaust is connected via a connecting hose to the exhaust connection 15 which is in turn releasably fastened on the catalyzer casing 3. The latter has seals 22, 23 at both ends. After the release of the screw or quick-release connections connecting the catalyzer casing 3 to the elbow 2 and the exhaust connection, the casing 3 can be withdrawn and the cartridge removed.

Figure 2:
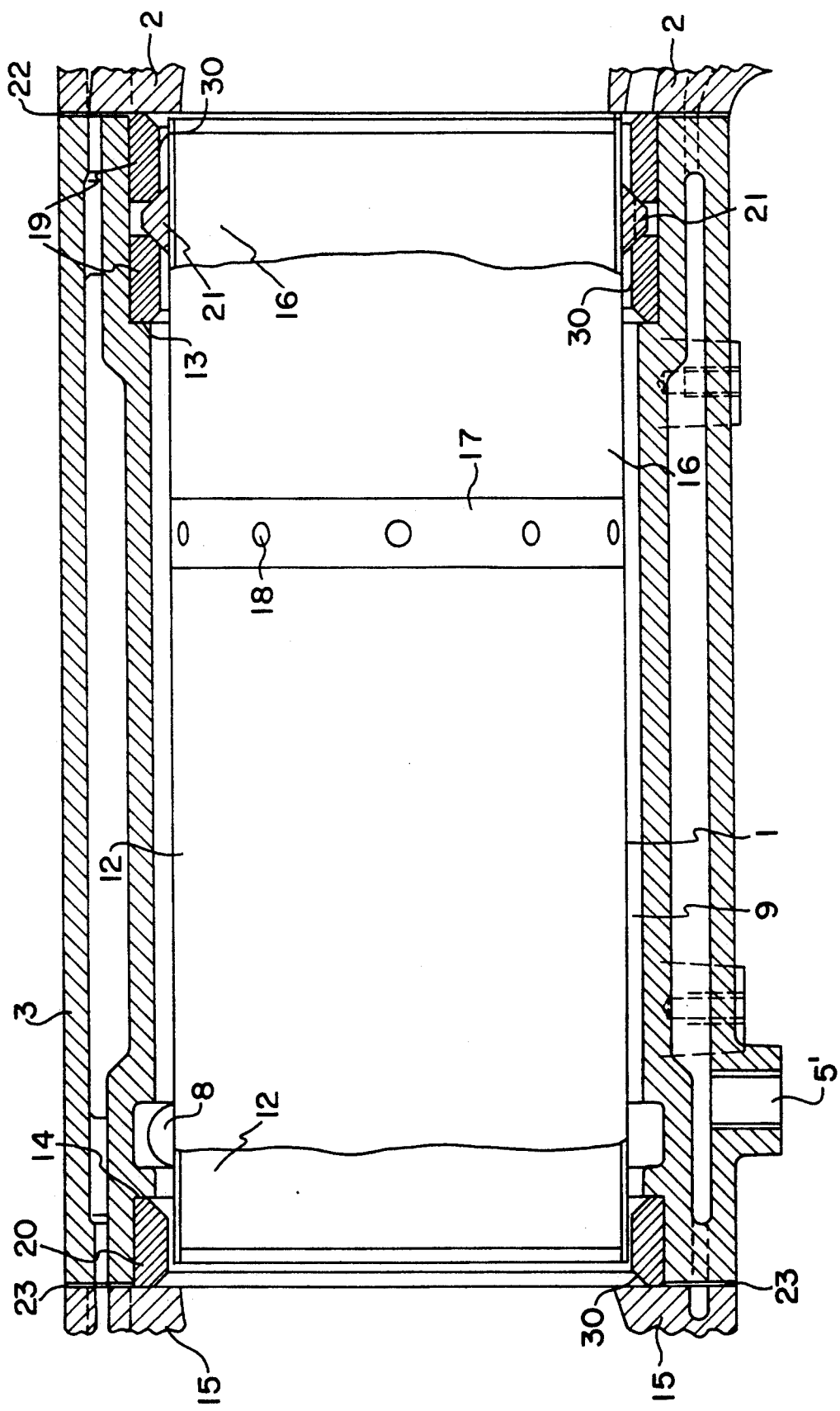
FIG. 2 shows the support for the cartridge

FIG. 2 shows the double-walled water-cooled catalyzer casing 3 and the respective support at each end in wire compression rings 19 and 20. For this purpose, the catalyzer casing has corresponding recesses 13 and 14 with internal shoulders against which the wire compression rings are pressed by the end surfaces of the elbow 2 and the exhaust connection 15.

The wire compression rings 19, 20 are over-dimensioned to a certain extent so that they are deformed (elastically) when the catalyzer casing 3 is assembled between the exhaust connection 15 and the elbow 2. By this means—together with the trapezoidal ring 21 welded onto the cartridge 1, with which they are in contact on both sides—they form a fixed support, and on the oxidation or downstream end a movable support. The ring 21 is not fundamentally limited to the trapezoidal shape but this does offer the advantage of a larger distance between the wire compression rings 19 from one another and, because of the oblique attitude of the flanks, a vibration-damping but still sufficiently stable fixing of the cartridge 1 within the fixed support.

In order to be able to utilize identical components and because of the advantage of the deformation of the wire compression rings towards the central axis, all the wire compression rings are here shown with oblique flanks 31 matched approximately to the trapezoidal ring 21; in principle, other shapes are also possible here.

The wire compression rings 19, 20 are squeezed during the assembly of the exhaust connection 15 and the elbow 2 and are in contact with the walls of the recesses 13 and 14. This provides the possibility of sealing the air gap 9 towards the outside.

For this purpose, the wire compression rings are inserted in the wheel rim-shaped support rings 30 manufactured from sheet metal. The side flanks of these support rings 30 are in contact both with the end surfaces of the recesses 14, 15 and with the surfaces of the trapezoidal ring 21 and extend radially outward from the cartridge at an angle 8 from a border 32. When the wire compression ring 20 is in the assembled condition, the lower surfaces of the support rings 30 are in contact with the cartridge 1. The recess 13 in the catalyzer casing 3 is dimensioned in such a way here that the inner surface of the support ring does not touch the cartridge 1 in the clamped condition, because otherwise this could have a negative influence on the sealing.

The assembly and dismantling of the catalyzer cartridge are therefore recognisably simple. It is only necessary to release the screw connections to the elbow 2 and the exhaust connection 15. By this means, the wire compression rings and support rings are relieved of stress, the wire compression ring expands vertically, is released from the cartridge 1 and releases it so that the cartridge, together with the outer wire compression ring 19 can be withdrawn from the catalyzer casing.

This type of catalyzer arrangement conducts so little heat away that aluminum can be used as the catalyzer casing material without difficulty even in the case of gap widths of a few millimeters (1–10) and surface temperatures of the cartridge 1 of over 900° C.

FIG. 3 shows the arrangement of two catalyzer casings 3 on a V-8 boat engine. The blower 27 (vane cell wheel) is driven by a V-belt 29 which supplies secondary air via the ducts 28 into the air gap between the catalyzer casing 3 and the cartridge 1 in counterflow to the exhaust gases. The secondary air passes through the holes 18 into the oxidation catalyzer part located downstream. The detoxicated gas leaves the catalyzer via the exhaust connection piece 15 and reaches the exhaust 25 via the rubber hose 26.

The elbow 2, which is screwed onto the exhaust manifold located under it, is also double-walled and water-cooled, is located upstream of the catalyzer casing 3.

As stated above, the elbow 2 is preferably bent by more than 90° (in the case of a plane connection to the manifold) so that the cartridge 1 is inclined downstream in the exhaust gas direction and condensate or sea water which has penetrated can also drain out.

The catalytically treated engine exhaust gases have such a high temperature that emergence from the catalyzer casing onto the boat body or installation parts represents a clear danger of fire. The gases expelled via the exhaust are water-cooled and do not, therefore, represent a danger.

If the blower 27 should fail or if the ducts 28 should be fractured, however, hot exhaust gas could emerge at this point, so that boat components are therefore protected, according to the invention, by non-return valves 24 with fixed location on the catalyzer casing.

We claim:

1. An apparatus for reducing harmful emissions from boat engines, said apparatus comprising:
   an exhaust line having an elbow having a first end and a second end;
   a water cooled housing having a first end connected to said first end of said elbow and also having a second end;
   an exhaust connection detachably connected to said second end of said housing;
   a metal cartridge positioned within said housing with an air gap provided intermediate said cartridge and said housing, said cartridge having air openings formed therein; and
   a metal catalyst, mounted in said cartridge, so as to allow exhaust gasses to flow therethrough, said catalyst having a reducing part having a trapezoidal ring formed thereon and an oxidizing part, said oxidizing part being in flow communication with said reducing part and being located axially downstream of said reducing part, said catalyst also having a space which is positioned intermediate said oxidation part and said reducing part so as to allow secondary air to be introduced into said oxidizing part from said air gap and said air openings;
   wherein said housing further comprises an inner wall having front and rear recesses on said inner wall said front recesses further comprising a plurality of first compression rings, said first compression rings constructed so as to contact said front recess, said first compression rings further constructed so as to contact said trapezoidal ring, said first compression rings and said trapezoidal ring being clamped in place by said elbow of said exhaust line, and wherein said rear recess comprises a second compression ring, said second compression ring constructed so as to surround said oxidizing part, said second compression ring further constructed so as to be supported against said rear recess by said cartridge and by said exhaust connection so as to form a removable support for said cartridge.

2. The apparatus according to claim 1, further comprising deformable metal support rings which seal said air gap and in which said compression rings are mounted.

3. The apparatus according to claim 2, wherein said compression rings and said support rings have flanks which expand radially outward from said cartridge.

4. The apparatus according to claim 1, further comprising an exhaust manifold to which said elbow is connected, and wherein said elbow has a curvature of at least 90°.

5. The apparatus according to claim 1, further comprising check valves which are mounted on said housing so as to allow secondary air to be blown into said housing.

6. The apparatus according to claim 1, further comprising at least one of a gas sampling probe and a lambda probe located in each of said exhaust line and said exhaust connection.

7. The apparatus according to claim 1, wherein said catalyst is inclined downwardly towards said exhaust connection.

8. The apparatus according to claim 1, wherein feeder inlets are formed in said elbow to allow passage of secondary air therethrough.

9. The apparatus according to claim 1, wherein said compression rings and said trapezoidal ring are made from sheet metal plate.

10. An apparatus for reducing harmful emissions from boat engines, said apparatus comprising:
    an exhaust line having an elbow having a first end connected to an exhaust manifold and also having a second end, said elbow having a bend of at least 90°;
    a water cooled housing having a first end detachably connected to said second end of said elbow and also having a second end;
    an exhaust connection detachably connected to said second end of said housing;
    a metal cartridge positioned within said housing with an air gap provided intermediate said cartridge and said housing, said cartridge having air openings formed therein; and
    a metal catalyst mounted in said cartridge so as to allow exhaust gasses to flow therethrough, said catalyst having a reducing part, an oxidizing part located axially downstream of said reducing part in flow communication with said reducing part, and a space which is positioned intermediate said oxidation part and said reducing part so as to allow secondary air to be introduced into said oxidizing part from said air gap and said air openings.

11. The apparatus according to claim 9, wherein said oxidation part has a trapezoidal ring formed thereon, and wherein said housing has an inner wall having front and rear recesses formed thereon, further comprising compression rings which are provided in said front recess on opposite sides of said trapezoidal ring in contact therewith and which are clamped in place by said elbow of said exhaust line, and further comprising another compression ring which surrounds said oxidizing part and which is supported against said rear recess by said cartridge and by said exhaust connection to form a removable support for said cartridge.

12. The apparatus according to claim 11, wherein said compression rings and said trapezoidal ring are made from sheet metal plate.

13. The apparatus according to claim 11, further comprising deformable metal support rings which seal said air gap and to which said compression rings are mounted.

14. The apparatus according to claim 13, wherein said compression rings and said support rings have flanks which expand radially outward from said cartridge.

15. An apparatus for reducing harmful emissions from boat engines, said apparatus comprising:
   an exhaust line;
   a water cooled housing positioned within said exhaust line and having opposed ends;
   a metal cartridge positioned within said housing with an air gap provided intermediate said cartridge and said housing, said cartridge having air openings formed therein;
   a metal catalyst mounted in said cartridge so as to allow exhaust gasses to flow therethrough, said catalyst having a reducing part, and an oxidizing part located axially downstream of said reducing part in flow communication with said reducing part, and a space which is positioned intermediate said oxidation part and said reducing part so as to allow secondary air to be introduced into said oxidizing part from said air gap and said air openings; and
   at least one of a gas sampling probe and a lambda probe positioned in said exhaust line proximate each of said opposed ends of said housing.

* * * * *